United States Patent
Yu

(10) Patent No.: US 11,493,023 B2
(45) Date of Patent: Nov. 8, 2022

(54) WIND TURBINE CONTROL METHOD AND DEVICE, CONTROLLER, AND CONTROL SYSTEM

(71) Applicant: BEIJING GOLDWIND SCIENCE & CREATION WINDPOWER EQUIPMENT CO., LTD., Beijing (CN)

(72) Inventor: Chi Yu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 136 days.

(21) Appl. No.: 17/043,478

(22) PCT Filed: Jun. 27, 2019

(86) PCT No.: PCT/CN2019/093375
§ 371 (c)(1),
(2) Date: Sep. 29, 2020

(87) PCT Pub. No.: WO2020/001559
PCT Pub. Date: Jan. 2, 2020

(65) Prior Publication Data
US 2021/0054825 A1   Feb. 25, 2021

(30) Foreign Application Priority Data
Jun. 28, 2018 (CN) .......................... 201810691480.9

(51) Int. Cl.
*F03D 7/04* (2006.01)
*F03D 7/02* (2006.01)

(52) U.S. Cl.
CPC .......... *F03D 7/048* (2013.01); *F03D 7/0204* (2013.01); *F03D 7/0224* (2013.01); *F05B 2260/70* (2013.01); *F05B 2270/321* (2013.01)

(58) Field of Classification Search
CPC ...................................................... F03D 7/048
See application file for complete search history.

(56) References Cited

U.S. PATENT DOCUMENTS

| | | | |
|---|---|---|---|
| 8,035,241 B2 * | 10/2011 | Subramanian | F03D 7/028 290/55 |
| 8,987,929 B2 * | 3/2015 | Jayant | F03D 7/0224 290/55 |

(Continued)

FOREIGN PATENT DOCUMENTS

| | | |
|---|---|---|
| CN | 1975155 A | 6/2007 |
| CN | 102609590 A | 7/2012 |

(Continued)

OTHER PUBLICATIONS

European Search Report in corresponding European Application No. 19827431.8 dated Apr. 14, 2021 (8 pages).

(Continued)

*Primary Examiner* — Justin D Seabe
(74) *Attorney, Agent, or Firm* — Bayes PLLC

(57) ABSTRACT

A wind turbine control method includes: acquiring in real time a current wind direction of each upstream wind turbine in a wind farm; determining a current main wind direction to which the current wind direction of each upstream wind turbine belongs; determining, according to an association between the main wind directions of multiple upstream wind turbines and downstream wind turbines in the main wind directions, a downstream wind turbine associated with the current main wind direction of each upstream wind turbine; determining, according to an operating status and an operating parameter of the downstream wind turbine associated (Continued)

with the current main wind direction, a control instruction for each downstream wind turbine associated with the current main wind direction; and controlling, according to the control instruction, each downstream wind turbine associated with the current main wind direction. Also provided are a corresponding control device, a controller, and a control system.

16 Claims, 9 Drawing Sheets

(56) References Cited

U.S. PATENT DOCUMENTS

| | | | | |
|---|---|---|---|---|
| 9,140,239 | B2* | 9/2015 | Dalsgaard | F03D 7/048 |
| 10,364,796 | B2* | 7/2019 | Brath | F03D 7/0224 |
| 10,655,599 | B2* | 5/2020 | Woo | F03D 7/00 |
| 10,823,147 | B2* | 11/2020 | Ganireddy | H02J 3/386 |
| 2002/0000723 | A1 | 1/2002 | Weitkamp | |
| 2007/0124025 | A1 | 5/2007 | Schram et al. | |
| 2011/0208483 | A1 | 8/2011 | Dilkina et al. | |
| 2013/0052011 | A1* | 2/2013 | Badcock | F03B 17/061 416/1 |

FOREIGN PATENT DOCUMENTS

| | | |
|---|---|---|
| CN | 108798997 A | 11/2018 |
| EP | 2674617 A2 | 12/2013 |
| EP | 2728178 A1 | 5/2014 |
| EP | 2 757 255 A1 | 7/2014 |
| EP | 2 674 617 A3 | 7/2017 |
| WO | 2011076295 A2 | 6/2011 |

OTHER PUBLICATIONS

First Examination Report in corresponding Indian Application No. 202017046364 dated May 26, 2021 (6 pages).

International Search Report and Written Opinion issued in corresponding PCT Application No. PCT/CN2019/093375, dated Aug. 29, 2019, 11 pages.

* cited by examiner

WIND TURBINE CONTROL METHOD AND DEVICE, CONTROLLER, AND CONTROL SYSTEM

CROSS-REFERENCE TO RELATED APPLICATIONS

This application is the national phase of International Application No. PCT/CN2019/093375, titled "WIND TURBINE CONTROL METHOD AND DEVICE, CONTROLLER, AND CONTROL SYSTEM," filed on Jun. 27, 2019, which claims the priority to Chinese Patent Application No. 201810691480.9, titled "WIND TURBINE CONTROL METHOD AND DEVICE, CONTROLLER, AND CONTROL SYSTEM," filed on Jun. 28, 2018 with the China National Intellectual Property Administration (CNIPA). The entire contents of each of the above-identified application are expressly incorporated herein by reference.

TECHNICAL FIELD

The present disclosure relates to wind power generation technology, and in particular, the present disclosure relates to a control method, control apparatus, controller and control system for a wind turbine.

BACKGROUND

With the gradual expansion of the scale of wind turbines and the improvement of the safety protection of wind turbines, more and more attention is paid to technical indicators, such as power generation capacity and power generation efficiency of a wind turbine. The response speed of a wind turbine to changes in wind direction directly affects the power generation capacity and power generation efficiency of the wind turbine.

Generally, a wind turbine cannot effectively predict environmental changes and respond to the environmental changes quickly. If wind turbines in an entire wind farm are in a shutdown state, and the wind speed is increasing, each wind turbine will determine the wind speed acting on itself independently. If the wind speed is higher than a set threshold for a continuous time period, the wind turbine will start to yaw with respect to the wind and enter a standby state.

If the wind turbines in the entire wind farm are in a normal state of power generation and the wind direction changes significantly, each wind turbine will determine the wind independently based on the wind speed and wind direction data collected by its own senor. If a wind deviation is higher than a set threshold for a continuous time period, the wind turbine will yaw with respect to the wind, to keep in the state of power generation. However, in this case, the response of the wind turbine to environmental changes is relatively slow, and it often takes a long time from determining the wind by each wind turbine independently to the start of the yawing action with respect to the wind, which will result in loss of power generation.

For example, if the wind turbines in the entire wind farm are in the normal state of power generation, and suddenly strong turbulent wind comes, the wind turbines cannot respond quickly and only have to bear load impacts of the wind turbines, hence resulting in loss of power generation.

SUMMARY

A control method for a wind turbine is provided in an embodiment of the present disclosure. The control method includes:

obtaining a current wind direction of each upstream wind turbine in a wind farm in real time;

determining a current main wind direction to which the current wind direction of each upstream wind turbine belongs;

determining a downstream wind turbine associated with the current main wind direction of each upstream wind turbine, based on a pre-obtained association relationship between main wind directions of multiple upstream wind turbines and downstream wind turbines in the main wind directions;

determining a control instruction for each downstream wind turbine associated with the current main wind direction, based on an operation state and an operation parameter of the downstream wind turbine associated with the current main wind direction; and controlling each downstream wind turbine associated with the current main wind direction, based on the control instruction.

A control apparatus for a wind turbine is provided in an embodiment of the present disclosure. The control apparatus includes:

a current wind direction determination module, configured to obtain a current wind direction of each upstream wind turbine in a wind farm in real time;

a main wind direction determination module, configured to determine a current main wind direction to which the current wind direction of each upstream wind turbine belongs;

a downstream wind turbine determination module, configured to determine a downstream wind turbine associated with the current main wind direction of each upstream wind turbine, based on a pre-obtained association relationship between main wind directions of multiple upstream wind turbines and downstream wind turbines in the main wind directions; and determine a control instruction for each downstream wind turbine associated with the current main wind direction, based on an operation state and an operation parameter of the downstream wind turbine associated with the current main wind direction.

A controller for a wind turbine is provided in an embodiment of the present disclosure, in which the controller is communicatively connected with the control apparatus for the wind turbine described above. The controller includes: a receiving module, configured to receive the control instruction for each downstream wind turbine associated with the current main wind direction sent by the control apparatus; and a control module, configured to control each downstream wind turbine associated with the current main wind direction based on the control instruction received by the receiving module.

A control system for a wind turbine is provided in an embodiment of the present disclosure. The control system includes: the control apparatus described above; and the controller described above, and the controller is communicatively connected with the control apparatus.

A computer-readable storage medium is provided in an embodiment of the present disclosure. The computer-readable storage medium is stored with a computer program, and the computer program, when executed by a processor, implements the control method for the wind turbine described above.

By means of the control apparatus for the wind turbine according to the embodiments of the present disclosure, it is possible to control the downstream wind turbine to yaw with respect to the wind in advance by sensing wind power and wind direction of the upstream wind turbine through a control algorithm, so that the downstream wind turbine downstream wind turbine can respond in advance, which effectively reduces the loss of power generation and improves power generation efficiency.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION OF EMBODIMENTS

Figure 1:
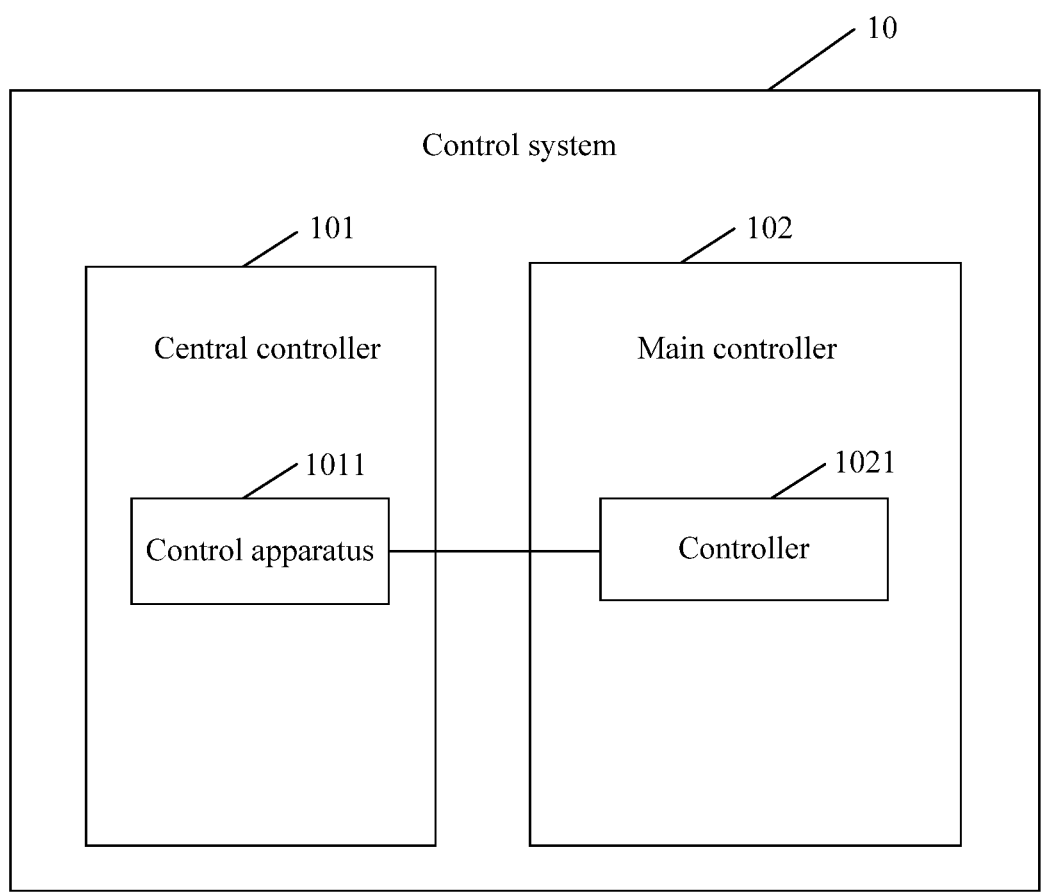
FIG. 1 is a block diagram of a control system for a wind turbine according to an embodiment of the present disclosure.

The embodiments of the present disclosure are described in detail as follows. Some examples are shown in the drawings, throughout which the same or similar reference numerals indicate the same or similar elements, or elements with the same or similar functions. The embodiments described below with reference to the accompanying drawings are merely illustrative, and cannot be regarded as a limitation of the present disclosure.

Those skilled in the art can understand that, unless otherwise defined, all terms (including technical terms and scientific terms) used herein have the same meanings as those commonly understood by those ordinary skilled in the art to which this disclosure belongs. It should also be understood that, unless specifically defined, terms such as those defined in general dictionaries should be understood to have meanings consistent with the meanings in the context of related technologies, and should not be interpreted with idealized or overly formal meanings.

Technical terms involved in the present disclosure are illustrated firstly in the following.

With regard to the upwind and downwind, an upwind position refers to a place where wind blows first, while a downwind position refers to a place where the wind blows later. The upwind may also be understood as a direction from which the wind blows. The wind in nature usually blows from the upwind to the downwind.

An upstream wind turbine refers to a wind turbine located at the upwind position.

A downstream wind turbine refers to a wind turbine located at the downwind position.

Then, the embodiments of the present disclosure will be described in detail with reference to the drawings.

FIG. 1 is a block diagram of a control system 10 for a wind turbine according to an embodiment of the present disclosure. As shown in FIG. 1, the control system 10 may include: a central controller 101 of a wind farm and a main controller 102 of a wind turbine. The main controller 102 may include a controller 1021 for a wind turbine. The central controller 101 may include a control apparatus 1011 for a wind turbine. The control apparatus 1011 may be communicatively connected to the controller 1021.

Figure 2:
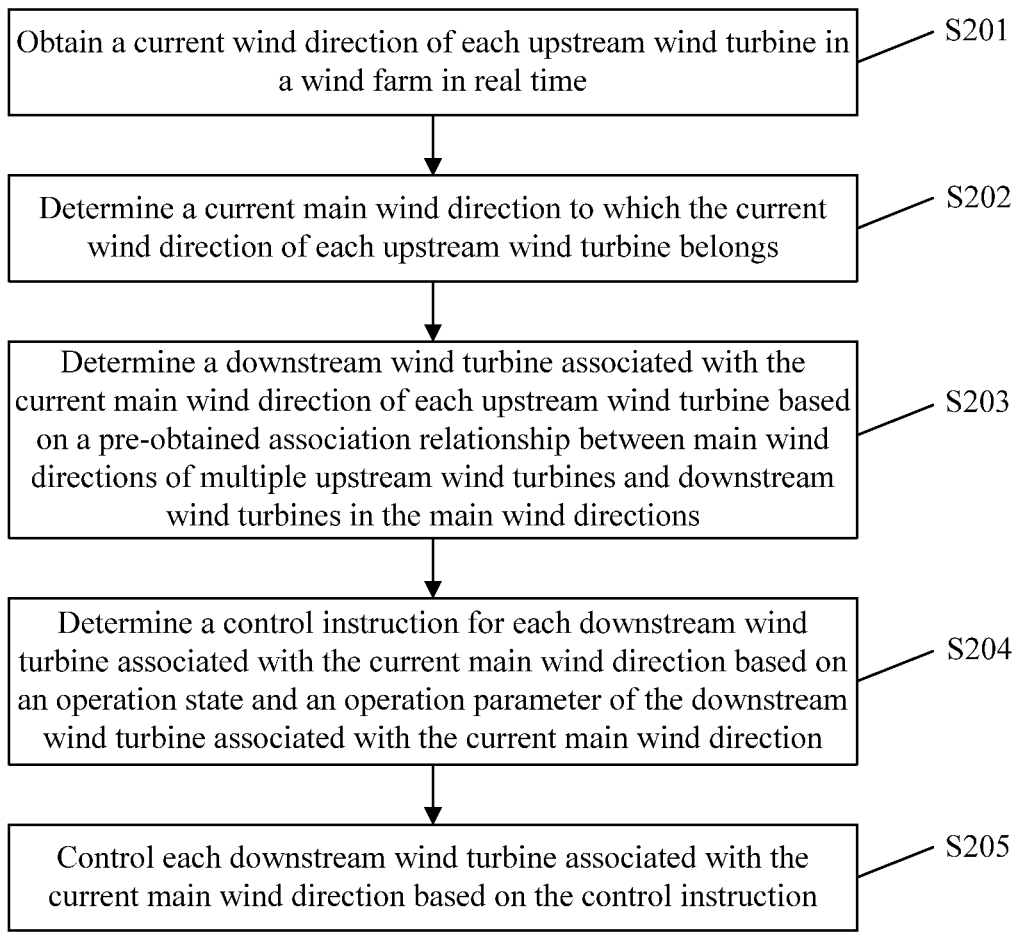
FIG. 2 is a flow chart of a control method for a wind turbine according to an embodiment of the present disclosure.

FIG. 2 is a flow chart of a control method for a wind turbine according to an embodiment of the present disclosure.

In step S201, a current wind direction of each upstream wind turbine in a wind farm may be obtained (for example, by a sensor) in real time.

In step S202, a current main wind direction to which the current wind direction of each upstream wind turbine belongs may be determined. For example, it may be determined whether the current wind direction of each upstream wind turbine belongs to one of main wind directions of the upstream wind turbine, based on a pre-obtained association relationship between main wind directions of multiple upstream wind turbines and downstream wind turbines in the main wind directions. If it is determined that the current wind direction of the upstream wind turbine belongs to one of the main wind directions of the upstream wind turbine, a main wind direction to which the current wind direction belongs may be determined as the current main wind direction.

In step S203, a downstream wind turbine associated with the current main wind direction of each upstream wind turbine may be determined based on the association relationship.

In step S204, a control instruction for each downstream wind turbine associated with the current main wind direction may be determined based on an operation state and an operation parameter of the downstream wind turbine associated with the current main wind direction. The operation parameter includes but not limited to, a time stamp, a wind speed, an absolute wind direction, a yawing position, a wind direction angle, a wind turbine status, an impeller speed, a pitch angle and the like.

For example, it may be determined whether each downstream wind turbine associated with the current main wind direction is in a shutdown state or a standby state. If it is determined that each downstream wind turbine is in the shutdown state or the standby state, it may be determined a first yawing deviation of each downstream wind turbine associated with the current main wind direction, based on a current wind direction of an upstream wind turbine belonging to the current main wind direction and a yawing position of each downstream wind turbine associated with the current main wind direction, and it may be generated a yawing control instruction for each downstream wind turbine associated with the current main wind direction, based on the first yawing deviation.

For example, it may be determined whether each downstream wind turbine associated with the current main wind direction is in a grid-connected power generation state. If it is determined that each downstream wind turbine is in the grid-connected power generation state, it may be determined a second yawing deviation of each downstream wind turbine associated with the current main wind direction, in response to an average wind direction change angle of an upstream wind turbine belonging to the current main wind direction in a first specified time period being greater than a first threshold, and it may be generated a yawing control instruction for each downstream wind turbine associated with the current main wind, based on the second yawing deviation.

For example, it may be determined whether each downstream wind turbine associated with the current main wind direction is in a gird-connected power generation state. If it is determined that each downstream wind turbine is in the gird-connected power generation state, it may be determined whether an average wind speed change of an upstream wind turbine belonging to the current main wind direction in a second specified time period is greater than a second threshold. If the average wind speed change is greater than the second threshold, it may be determined whether a pitch angle of each downstream wind turbine associated with the upstream wind turbine belonging to the current main wind direction is within a specified range. If the pitch angle is within the specified range, it may be determined a minimum pitch angle of each downstream wind turbine associated with the current main wind direction, and it may be generated a pitch control instruction for each downstream wind turbine associated with the current main wind direction based on the minimum pitch angle.

In step S205, each downstream wind turbine associated with the current main wind direction may be controlled based on the control instruction.

In addition, according to the embodiment of the present disclosure, the control method may further include: determining whether a current operation state of each upstream wind turbine belongs to a grid-connected state; and performing the above step S204 if it is determined that the current operation state of each upstream wind turbine belongs to the grid-connected state.

As described above, when the downstream wind turbine starts to generate electricity, the central controller 101 can control in advance the downstream wind turbine to make a yawing action in accordance with the control instruction, based on wind direction and wind speed information sensed by the upstream wind turbine, thereby improving the power generation efficiency.

Figure 3:
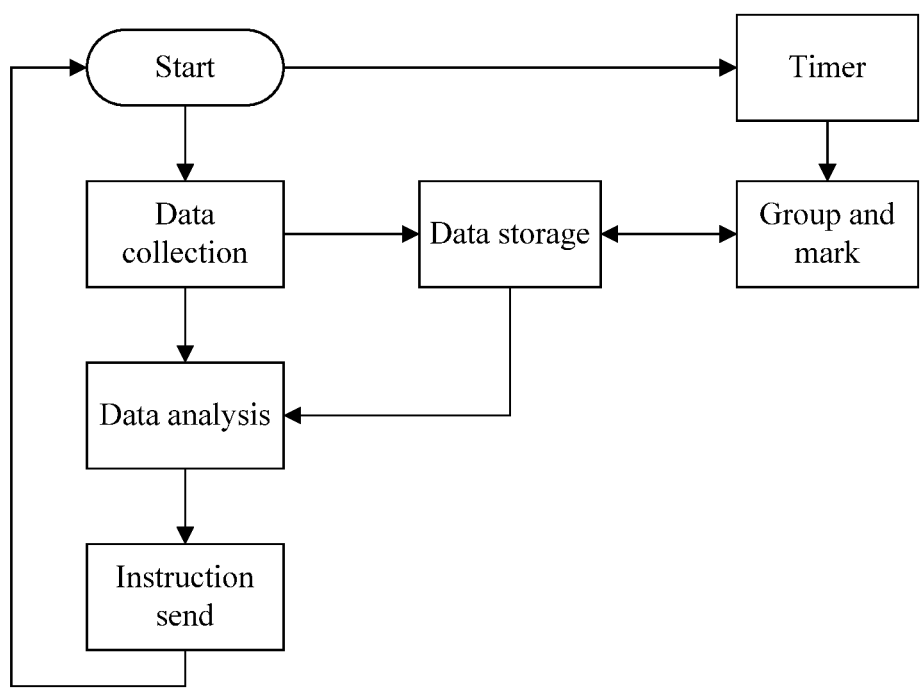
FIG. 3 is a functional block diagram of a control system for a wind turbine according to an embodiment of the present disclosure.

FIG. 3 is a functional block diagram of a control system for a wind turbine according to an embodiment of the present disclosure.

The control system for the wind turbine according to the embodiment of the present disclosure may include: a data collection module, a data analysis module, an instruction send module, a timer module, a data storage module, and a grouping and marking module.

The data collection module may collect data in real time, such as a time stamp, a wind speed, an absolute wind direction, a yawing position, a wind direction angle, a wind turbine status, an impeller speed, a pitch angle of wind turbines in the entire wind farm. A sampling frequency may be a specified frequency, for example, the sampling frequency is 1 Hz. It should be noted that, time stamps collected by all the wind turbines need to be consistent, for example, all time stamps are subject to the time of the central controller.

The data analysis module may read current data collected by the above-mentioned data collection module in real time, and process it with a specific algorithm, so as to determine whether a current wind direction of an upstream wind turbine is one of main wind directions of the upstream wind turbine; and analyze an operation state of a downstream wind turbine belonging to a current main wind direction, and analyze whether the operation state of the downstream wind turbine belongs to start-up in small wind, sudden wind direction change or gusty turbulence. The data analysis module may provide a control instruction for the downstream wind turbine associated with the current main wind direction by combing a result of an association relationship between wind turbines calculated by the grouping and marking module.

The data storage module may meet the fast read and write performance on large amounts of data, and may include a real-time database, a relational database and/or a file database and the like. The data storage module may store data collected by the above-mentioned data collection module, and store main wind direction information of wind turbines in the entire wind farm, information of upstream wind turbines, and information of downstream wind turbines, and the like.

The grouping and marking module may read data for a certain time period from the above data storage module, and perform a calculation on the read data. The reading and calculation functions by the grouping and marking module do not have to be run all the time, and only need to be run once every certain period.

The timer module may periodically call the grouping and marking module. For example, a calling cycle may be no less than 1 day and no more than 30 days.

The instruction send module can realize fast communication between a central controller (also known as a wind farm controller) and all wind turbines in the wind farm through a general protocol, and send a control instruction to each downstream wind turbine associated with the current main wind direction. The controller according to the embodiment of the present disclosure can control each downstream wind turbine associated with the current main wind direction based on the obtained control instruction.

The above control system for the wind turbine according to the embodiment of the present disclosure can analyze the collected data such as the time stamp, wind speed, absolute wind direction, yawing position, wind direction angle, wind turbine status, impeller speed, and pitch angle of the wind turbine by means of the central controller (also called the wind farm controller), interact with data of the wind turbines, and realize logic calculation and signal processing functions by a control module in the central controller.

Figure 4:
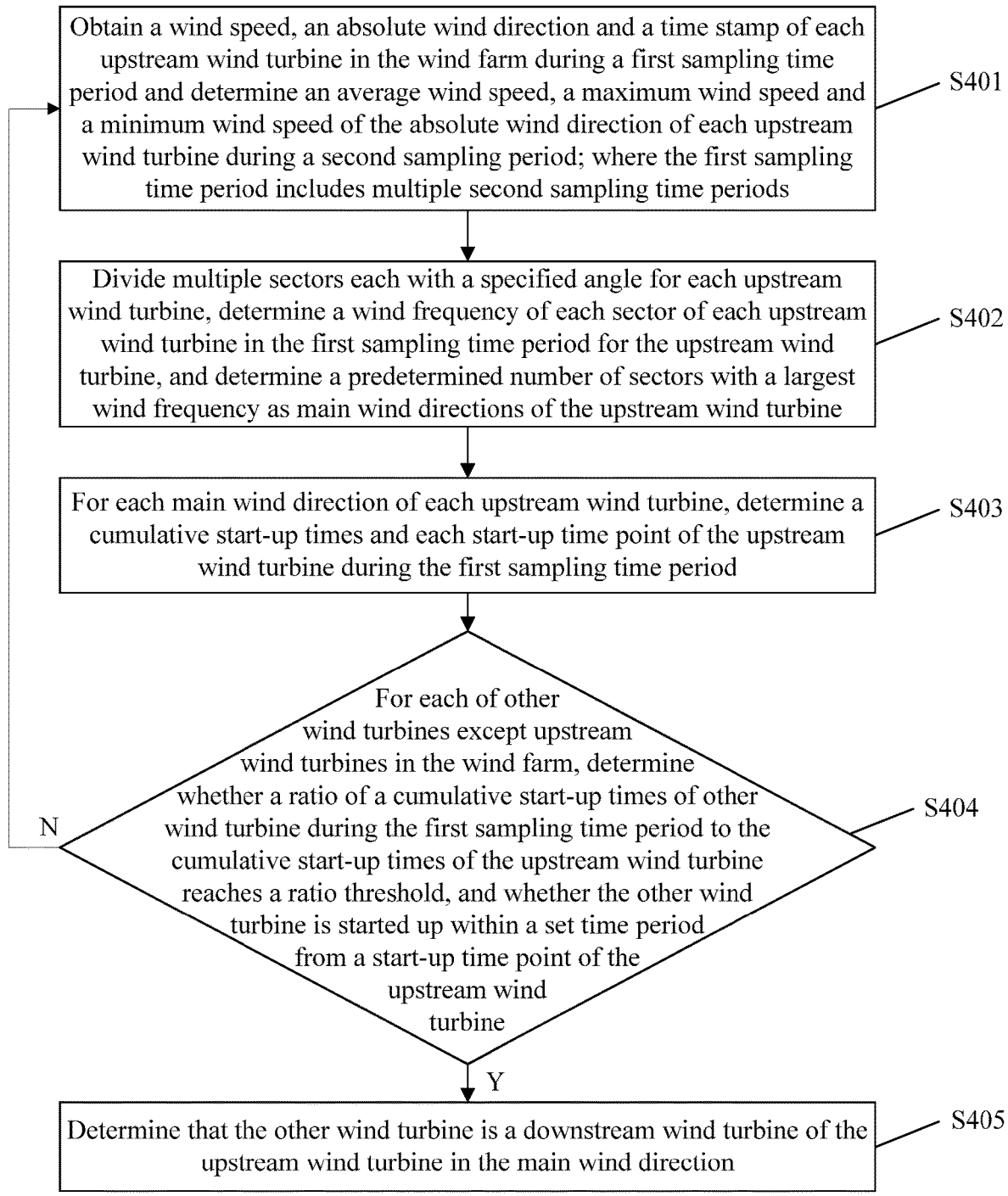
FIG. 4 is a flow chart illustrating a method for determining an association relationship between main wind directions of multiple upstream wind turbines and downstream wind turbines in the main wind directions according to an embodiment of the present disclosure.

FIG. 4 is a flow chart illustrating a method for determining an association relationship between main wind directions of multiple upstream wind turbines and downstream wind turbines in the main wind directions according to an embodiment of the present disclosure.

In step S401, it may be obtained a wind speed, an absolute wind direction and a time stamp of each upstream wind turbine in the wind farm during a first sampling time period, and determined an average wind speed, a maximum wind speed and a minimum wind speed in the absolute wind direction of each upstream wind turbine during a second sampling period. Specifically, the first sampling time period may include multiple second sampling time periods. For example, the first sampling time period may be set to 3 months, and the second sampling time period may be set to 10 minutes (that is, 10 min).

In step S402, it may be divided multiple sectors each with a specified angle for each upstream wind turbine, determined a wind frequency of each sector in the first sampling time period, and determined a predetermined number of sectors with a largest wind frequency as main wind directions of the upstream wind turbine. For example, for each sector of each upstream wind turbine, it may be determined a frequency that the average wind speed during the second sampling time period in the absolute wind direction appears in the sector during the first sampling time period, and the frequency is determined as the wind frequency. For example, it may be calculated an average wind speed within 10 minutes in the absolute wind direction, and calculated a wind frequency of each sector within the last 3 months.

In step S403, for each main wind direction of each upstream wind turbine, it may be determined a cumulative start-up times and each start-up time point of the upstream wind turbine during the first sampling time period.

In step S404, for each of other wind turbines except upstream wind turbines in the wind farm, it may be determined whether a ratio of a cumulative start-up times of other wind turbine during the first sampling time period to the cumulative start-up times of the upstream wind turbine reaches a ratio threshold, and whether the other wind turbine is started up within a set time period from the start-up time point of the upstream wind turbine. In response to both positive determination results, it may be determined in step S405 that the other wind turbine is a downstream wind turbine of the upstream wind turbine in the main wind direction. If the two determination results are not both positive, it may be returned to the step S401. For example, the cumulative start-up times of the upstream wind turbine may be set to N, and the ratio threshold may be set to 0.8.

Hence, an association relationship among each upstream wind turbine, each main wind direction of the upstream wind turbine, and a downstream wind turbine in the main wind direction may be established.

In the embodiment of the present disclosure, the update frequency of the above association relationship or the update frequency of internal parameters may be: never update once established, update once a year, update once a quarter, update once a month, update once a dozen days, update every few days, or the like.

In addition, the above association relationship may also be obtained in advance through a man-machine interaction interface. Specifically, the association relationship among each upstream wind turbine, each main wind direction of the upstream wind turbine, and the downstream wind turbine in the main wind direction may be received through the man-machine interaction interface.

Figure 5:
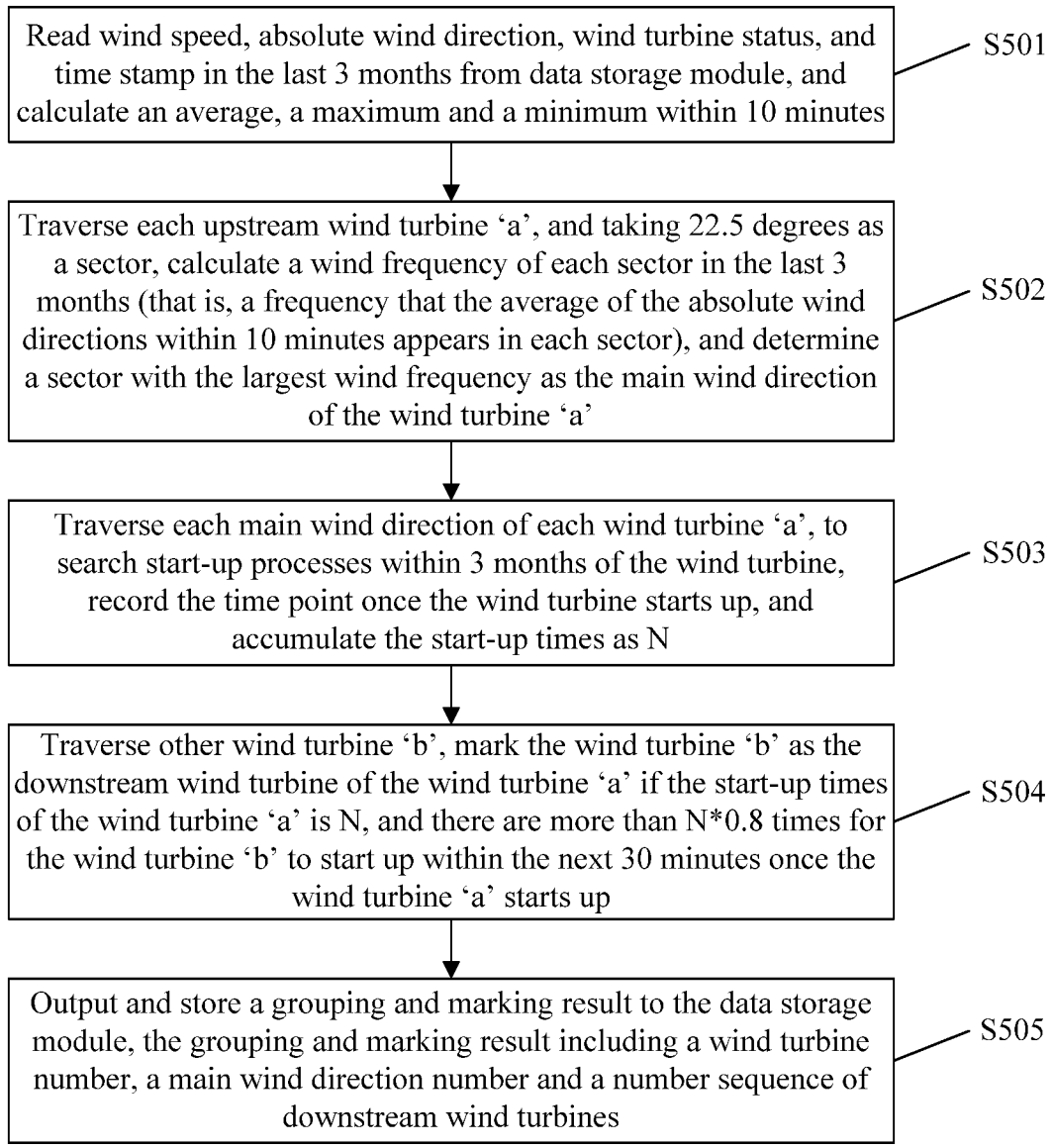
FIG. 5 is a flow chart illustrating operations of a grouping and marking module as shown in FIG. 3 according to an embodiment of the present disclosure.

FIG. 5 is a flow chart illustrating operations of the grouping and marking module as shown in FIG. 3 according to an embodiment of the present disclosure, in which the calculation process performed by the grouping and marking module is described by taking sample data in the last 3 months as an example.

In step S501, the grouping and marking module may read data in the last 3 months such as a wind speed, an absolute wind direction, a wind turbine status and a time stamp from the data storage module, and may calculate an average, a maximum and a minimum of the wind speed and/or the absolute wind direction within a time period of 10 minutes.

In step S502, each upstream wind turbine 'a' may be traversed. Taking 22.5° as one sector, a wind frequency of each sector in the last 3 months may be calculated, and one sector with a largest wind frequency or two sectors respectively with largest and second-largest wind frequencies may be taken as the main wind direction(s) of the upstream wind turbine 'a'. The wind frequency refers to a frequency that the average of the absolute wind directions within 10 minutes appears in each sector in the last 3 months.

In step S503, each main wind direction of each upstream wind turbine 'a' may be traversed, to search start-up processes of the upstream wind turbine within 3 months. Once the upstream wind turbine starts up, the time point is recorded, and the start-up times are accumulated as N.

In step S504, other wind turbines 'b' may be traversed. If the start-up times of an upstream wind turbine 'a' is N, and there are more than N*0.8 times for a wind turbine 'b' to start up within the next 30 minutes once the upstream wind turbine 'a' starts up are, then the wind turbine 'b' may be marked as a downstream wind turbine of the upstream wind turbine 'a' in the main wind direction.

In step S505, the grouping and marking module may output a grouping and marking result and store the result into the data storage module. The grouping and marking result may include a wind turbine number of a downstream wind turbine of each upstream wind turbine in its main wind direction, a main wind direction number and a numbering sequence of downstream wind turbines.

The following explains how to represent an origin of a wind direction by a sector.

A wind direction usually refers to a direction from which the wind blows. The representation of a wind direction generally includes degree representation and azimuth representation. The degree representation is the most direct method for representing a wind direction, and represents an origin of the wind with a degree from 0 to 360, which is simple and popular. To more intuitively represent the origin of the wind, it may be used azimuth representation, which discretizes the wind direction from 0 degree to 360 degrees, and divides different wind directions into corresponding sectors. Generally, it may be set 16 sectors, and a sector is set every 22.5 degrees. For example, a wind direction with a range from 348.75 degrees to 360 degrees and a range from 0 to 11.25 degrees is north wind, being denoted as N; a wind direction with a range from 11.25 degrees to 33.75 degrees is north-northeast wind; and a wind direction with a range from 33.75 degrees to 56.25 degrees is northeast wind.

Figure 6A:
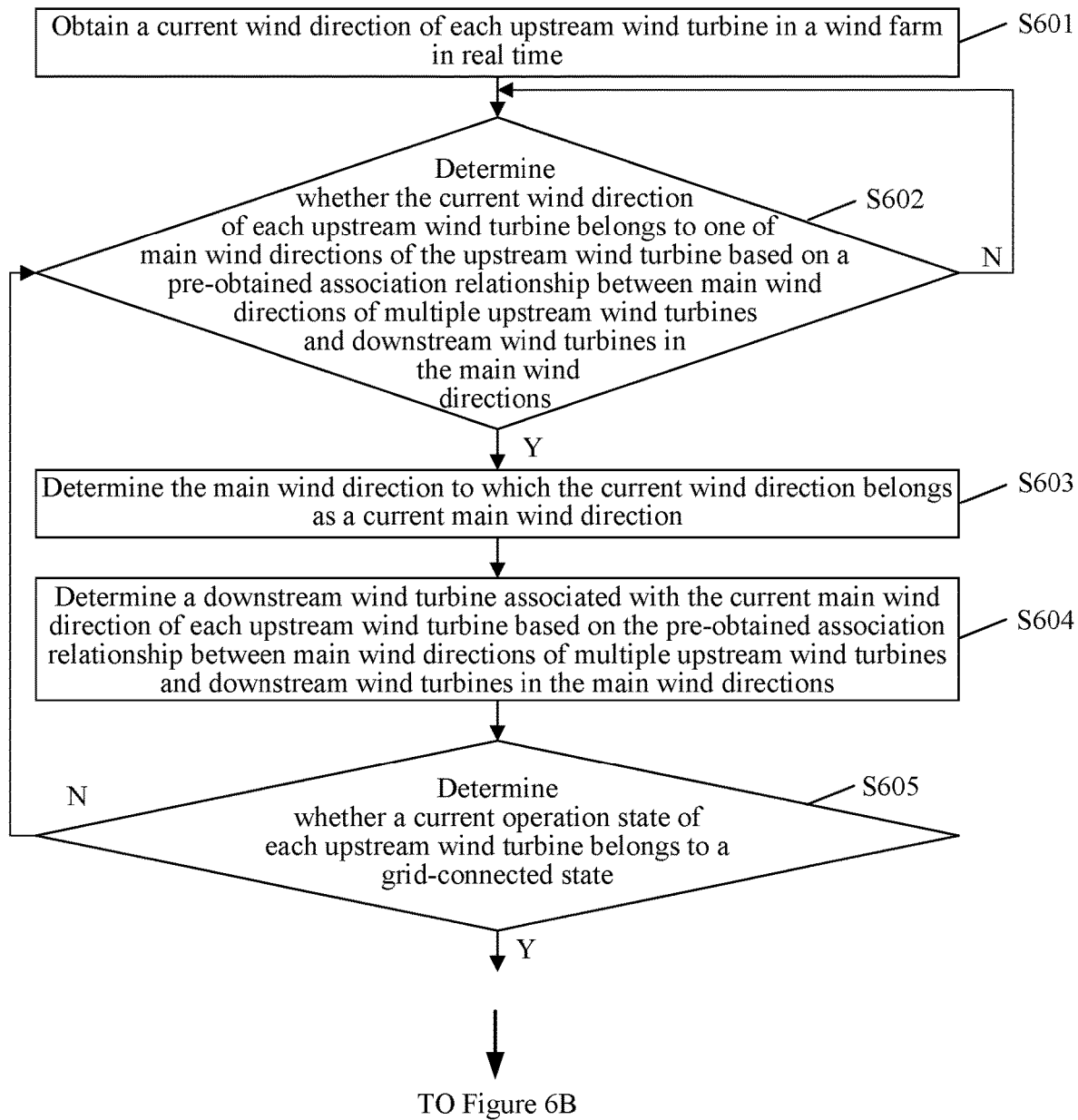
FIG. 6A and FIG. 6B show a flow chart illustrating operations of a data analysis module as shown in FIG. 3 according to an embodiment of the present disclosure.
Figure 6B:
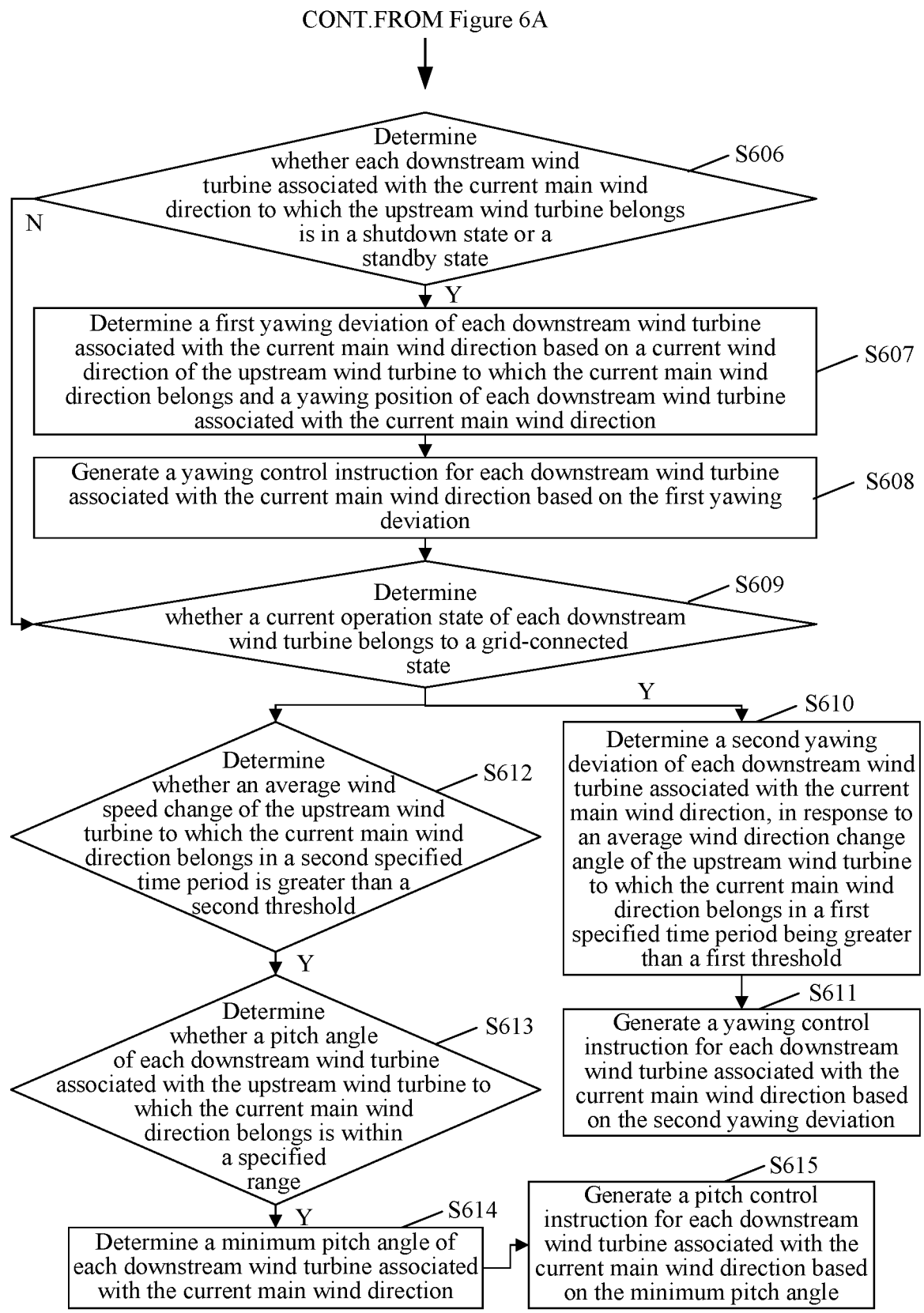

FIG. 6A and FIG. 6B show a flow chart illustrating operations of the data analysis module as shown in FIG. 3 according to an embodiment of the present disclosure.

In step S601, a current wind direction of each upstream wind turbine in a wind farm may be obtained in real time.

In step S602, it may be determined whether the current wind direction of each upstream wind turbine belongs to one of main wind directions of the upstream wind turbine, based on a pre-obtained association relationship between main wind directions of multiple upstream wind turbines and downstream wind turbines in the main wind directions. If it is determined that the current wind direction of each upstream wind turbine belongs to one of main wind directions of the upstream wind turbine, then proceed to step S603; or else, repeat to perform the step S602.

In step S603, the main wind direction to which the current wind direction belongs may be determined as a current main wind direction.

In step S604, it may be determined a downstream wind turbine associated with the current main wind direction of each upstream wind turbine, based on the association relationship.

In step S605, it may be determined whether a current operation state of each upstream wind turbine belongs to a grid-connected state. If the current operation state belongs to the grid-connected state, then proceed to step S606; or else, return to the step S602.

In step S606, it may be determined whether each downstream wind turbine associated with the current main wind direction is in a shutdown state or a standby state. If each downstream wind turbine is in the shutdown state or the standby state, then proceed to step S607; or else, proceed to step S609.

In step S607, it may be determined a first yawing deviation of each downstream wind turbine associated with the current main wind direction, based on a current wind direction of an upstream wind turbine belonging to the current main wind direction and a yawing position of each downstream wind turbine associated with the current main wind direction. For example, the first yawing deviation of each downstream wind turbine associated with the current main wind direction may be obtained by subtracting the yawing position of each downstream wind turbine associated with the current main wind direction from the current wind direction of the upstream wind turbine belonging to the current main wind direction.

In step S608, it may be generated a yawing control instruction for each downstream wind turbine associated with the current main wind direction, based on the first yawing deviation. For example, identification information of a downstream wind turbine associated with the current main wind direction may be carried into the yawing control instruction, and a yawing variable and a wind turbine state variable in the yawing control instruction may be set as the first yawing deviation and entering a standby state, respectively.

In step S609, it may be determined whether a current operation state of each downstream wind turbine associated with the current main wind direction belongs to a grid-connected state. If the current operation state of each downstream wind turbine belongs to the grid-connected state, then proceed to steps S610 and S612; or else, no operation will be performed.

In step S610, it may be determined a second yawing deviation of each downstream wind turbine associated with the current main wind direction, in response to an average wind direction change angle of an upstream wind turbine belonging to the current main wind direction in a first specified time period being greater than a first threshold. For example, the second yawing deviation of each downstream wind turbine associated with the current main wind direction may be obtained by subtracting an average absolute wind direction of the upstream wind turbine belonging to the current main wind direction in a previous first specified time period from an average absolute wind direction of the upstream wind turbine in a current first specified time period.

In step S611, it may be generated a yawing control instruction for each downstream wind turbine associated with the current main wind, based on the second yawing deviation. For example, identification information of a downstream wind turbine associated with the current main wind direction may be carried into the yawing control instruction, and a yawing variable in the yawing control instruction is set as the second yawing deviation.

In step S612, it may be determined whether an average wind speed change of an upstream wind turbine belonging to the current main wind direction in a second specified time period is greater than a second threshold. If the average wind speed change is greater than the second threshold, then proceed step S613; or else, no operation will be performed.

For example, the average wind speed change of the upstream wind turbine belonging to the current main wind direction in the second specified time period may be obtained by subtracting an average wind speed of the upstream wind turbine in a previous second specified time period from an average wind speed of the upstream wind turbine in a current second specified time period, thus to determine whether the average wind speed change is greater than the second threshold.

In step S613, it may be determined whether a pitch angle of each downstream wind turbine associated with the upstream wind turbine belonging to the current main wind direction is within a specified range. If the pitch angle is within the specified range, then proceed to step S614; or else, no operation will be performed.

In step S614, it may be determined a minimum pitch angle of each downstream wind turbine associated with the current main wind direction.

In step S615, it may be generated a pitch control instruction for each downstream wind turbine associated with the current main wind direction, based on the minimum pitch angle. For example, identification information of a downstream wind turbine associated with the current main wind direction may be carried into the pitch control instruction, and a pitch angle variable in the pitch control instruction is set as the minimum pitch angle.

In the embodiment of the present disclosure, to facilitate the wind turbine to receive and run the instruction, the pitch control instruction generated for each downstream wind turbine associated with the current main wind direction may have a fixed format. For example, the pitch control instruction may at least include a wind turbine number, a modified target variable name, and a target modified value, and may include multiple modified target variables. If the wind turbine is not in the above target operation state, the control instruction may not be outputted.

Figure 7:
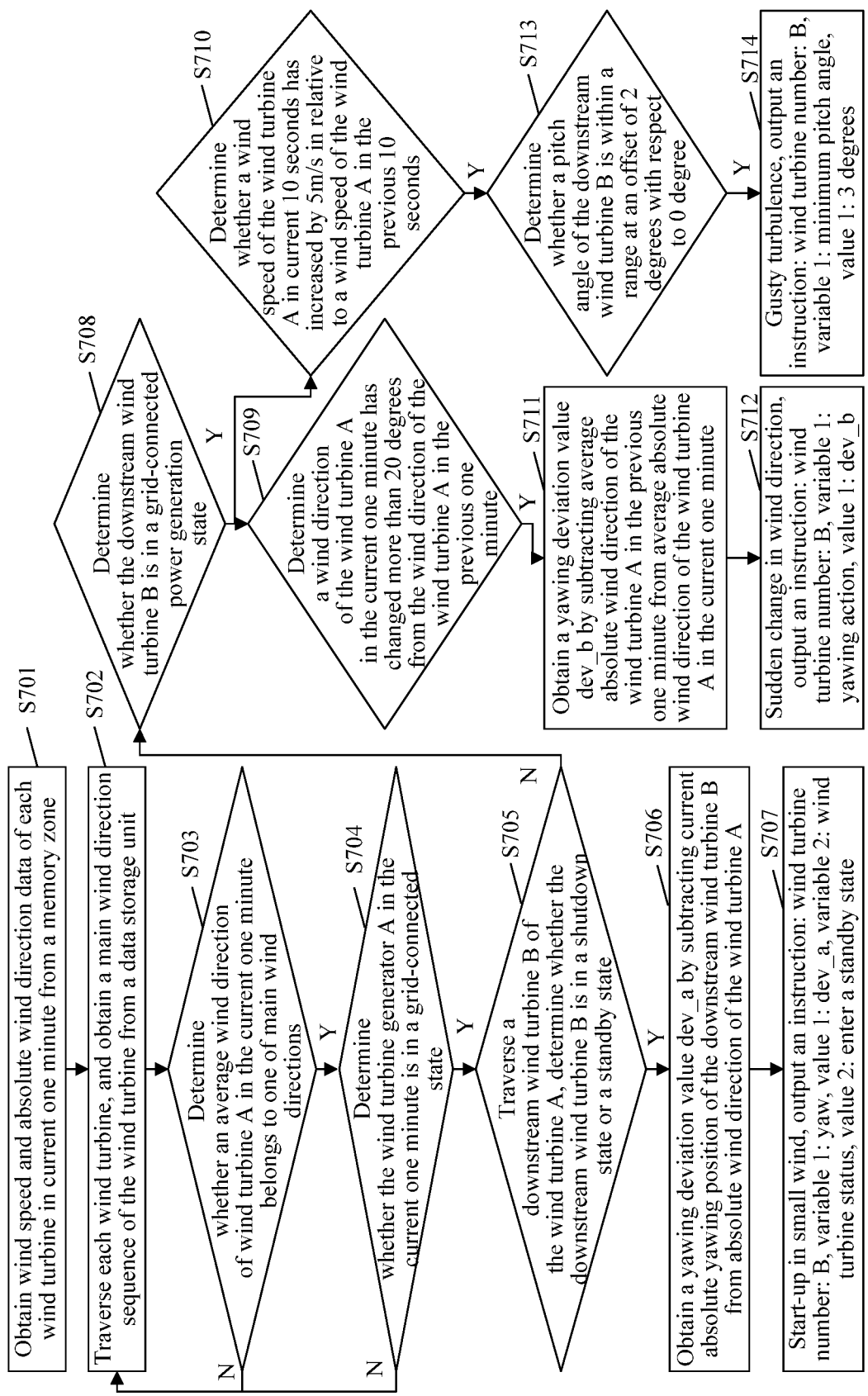
FIG. 7 is a flow chart illustrating operations of a data analysis module as shown in FIG. 3 according to another embodiment of the present disclosure.

FIG. 7 is a flow chart illustrating operations of the data analysis module as shown in FIG. 3 according to another embodiment of the present disclosure.

In step S701, the data analysis module may obtain wind speed and absolute wind direction data of each wind turbine in a current one minute from the data storage module.

In step S702, each wind turbine may be traversed, and a main wind direction sequence of the wind turbine is obtained from the data storage module.

In step S703, it may be determined whether an average wind direction of a certain wind turbine A in the current one minute belongs to one of main wind directions. If it is determined that the average wind direction belongs to one of the main wind directions, then proceed to step S704; or else, return to the step S702.

In step S704, it may be determined whether the wind turbine A is in a grid-connected state during the current one minute. If it is determined that the wind turbine A is in the grid-connected state during the current one minute, then proceed to step S705; or else, return to the step S702.

In step S705, a downstream wind turbine B of the wind turbine A may be traversed, to determine whether the downstream wind turbine B is in a shutdown state or a standby state. If the traverse result reflects that the downstream wind turbine B of the wind turbine A is in the shutdown state or the standby state, then proceed to step S706; or else, proceed to step S708.

In step S706, a yawing deviation value (equivalent to the first yawing deviation) may obtained by subtracting a value representing a current absolute yawing position of the downstream wind turbine B from a value representing an absolute wind direction of the wind turbine A. In a generated pitch control instruction with a fixed format, the yawing deviation value may be represented as "value 1: dev_a".

In step S707, it may be outputted a pitch control instruction for a downstream wind turbine associated with the main wind direction, and identification information of the downstream wind turbine representing start-up in small wind may be carried into the pitch control instruction. The pitch control instruction may include: wind turbine number: B; variable 1: yaw; value 1: dev_a; variable 2: wind turbine status; value 2: enter a standby state, which indicates that the operation state of the downstream wind turbine at this time is start-up in small wind, and the downstream wind turbine will enter the standby state.

In step S708, it may be determined whether the downstream wind turbine B is in a grid-connected power generation state. If it is determined that the downstream wind turbine B is in the grid-connected power generation state, proceed to steps S709 and S710; or else, no operation will be performed.

In step S709, it may be determined whether a wind direction of the upstream wind turbine A in the current one minute has changed more than 20 degrees from the wind direction of the wind turbine A in the previous one minute. If it is determined that such change is greater than 20 degrees, proceed to step S711; or else, no operation will be performed.

In step S711, a yawing deviation value (equivalent to a second yawing deviation) may be obtained by subtracting an average absolute wind direction of the wind turbine A in the previous one minute from an average absolute wind direction of the wind turbine A in the current one minute, and the yawing deviation value may be represented as "dev_b".

In step S712, it may be outputted a pitch control instruction for a downstream wind turbine associated with the main wind direction, and identification information of the downstream wind turbine representing sudden change in wind direction may be carried into the pitch control instruction. The pitch control instruction may include: wind turbine number: B; variable 1: yawing action; value 1: dev_b, which indicates that an operation state of the downstream wind turbine at this time is sudden change in wind direction, and the downstream wind turbine will perform a yawing action.

In step S710, it may be determined whether a wind speed of the upstream wind turbine A in the current 10 seconds has increased by 5 m/s in relative to a wind speed of the upstream wind turbine A in the previous 10 seconds. If it is determined that the wind speed has increased by 5 m/s, proceed to step S713; or else, no operation will be performed.

In step S713, it may be determined whether a pitch angle of the downstream wind turbine B is within a range at an offset of 2 degrees with respect to 0 degree. If it is determined that the pitch angle is within the range at an offset of 2 degrees with respect to 0 degree, proceed to step S714; or else, no operation will be performed.

In step S714, it may be determined a minimum pitch angle of each downstream wind turbine associated with the current main wind direction, and it may be generated a pitch control instruction for each downstream wind turbine associated with the current main wind direction based on the minimum pitch angle. In addition, it may be outputted a pitch control instruction for a downstream wind turbine associated with the main wind direction, and identification information of the downstream wind turbine representing gusty turbulence may be carried into the pitch control instruction. The pitch control instruction may include: wind turbine number: B; variable 1: minimum pitch angle; value 1:3 degrees, which indicates that an operation state of the downstream wind turbine at this time is gusty turbulence, and the downstream wind turbine will perform a yawing action.

Based on the same inventive concept, a control apparatus for a wind turbine is also provided in an embodiment of the present disclosure.

Figure 8:
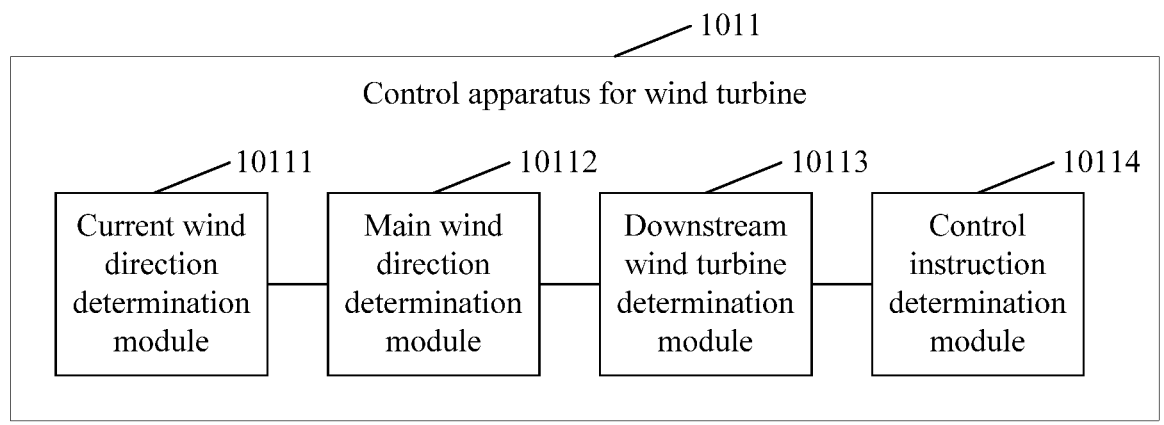
FIG. 8 is a block diagram of a control apparatus for a wind turbine according to an embodiment of the present disclosure.

Referring to FIG. 8, a control apparatus 1011 for a wind turbine may include: a current wind direction determination module 10111, a main wind direction determination module 10112, a downstream wind turbine determination module 10113, and a control instruction determination module 10114.

The current wind direction determination module 10111 may obtain a current wind direction of each upstream wind turbine in a wind farm in real time.

The main wind direction determination module 10112 may determine a current main wind direction to which the current wind direction of each upstream wind turbine belongs which is obtained in real time by the current wind direction determination module 10111.

The downstream wind turbine determination module 10113 may determine a downstream wind turbine associated with the current main wind direction of each upstream wind turbine, based on a pre-obtained association relationship between main wind directions of multiple upstream wind turbines and downstream wind turbines in the main wind directions.

The control instruction determination module 10114 may determine a control instruction for each downstream wind turbine associated with the current main wind direction, based on an operation state and an operation parameter of the downstream wind turbine associated with the current main wind direction.

In an embodiment, as shown in FIG. 1, the control apparatus 1011 may be integrated in the central controller 101 of the wind farm.

Based on the same inventive concept, a controller for a wind turbine is also provided in an embodiment of the present disclosure.

Figure 9:
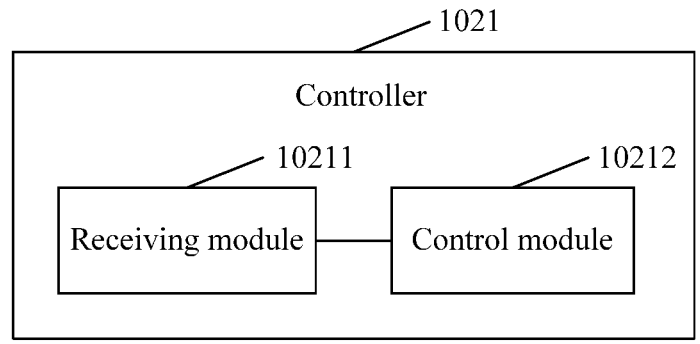
FIG. 9 is a block diagram of a controller for a wind turbine according to an embodiment of the present disclosure.

Referring to FIG. 9, a controller 1021 for a wind turbine may include a receiving module 10211 and a control module 10212. The controller 1021 may be communicatively connected with the control apparatus 1011 for the wind turbine as shown in FIG. 8.

The receiving module 10211 may receive the control instruction for each downstream wind turbine associated with the current main wind direction sent by the control apparatus 1011.

The control module 10212 may control each downstream wind turbine associated with the current main wind direction based on the control instruction received by the receiving module 10211.

In an embodiment, as shown in FIG. 1, the controller 1021 may be integrated in the main controller 102 of the wind turbine.

Based on the same inventive concept, a computer-readable storage medium is also provided in an embodiment of the present disclosure. The computer-readable storage medium is stored with a computer program, and the computer program, when executed by a processor, implements the control method for the wind turbine according to the embodiment of the present disclosure.

Based on the same inventive concept, a control system for a wind turbine is also provided in an embodiment of the present disclosure. The control system may include: the above control apparatus for the wind turbine; and the above controller for the wind turbine communicatively connected with the control apparatus.

As described above, in the embodiments of the present disclosure, the wind speed and wind direction may be predicted for the downstream wind turbine, and thus the wind turbine may start up in a small wind in advance. Moreover, the downstream wind turbine may be controlled in advance to make a yawing action after the downstream wind turbine starts to generate electricity. For example, usually a wind speed and wind direction data collected by a sensor of a wind turbine itself is used by the wind turbine as a basis for yawing with respect to the wind, thus it often takes a delay of about 20 minutes to determine the wind direction. If there is a large deviation between the direction from which the wind blows and the yawing position at which the wind turbine is stopped, it will take additional several minutes to complete the yawing action. Thus, the wind turbine starts to start up after the cumulative delay of about 30 minutes. In contrast, taking a matrix-type wind farm having an interval of 600 meters between wind turbines and wind speed being 5 m/s sensed by the upstream wind turbine when the wind blows as an example, the central controller in the embodiment of the present disclosure can control the downstream wind turbine to complete the yawing action before the wind arrives, so that the wind turbine has additional 30 minutes for power generation, which significantly improves the power generation and power generation efficiency of the wind turbine.

It should be understood that, although the various steps in the flow chart of the drawings are showed in sequence as indicated by the arrows, these steps are not necessarily performed in sequence in the order indicated by the arrows. Unless explicitly stated in this disclosure, these steps are not executed in a strictly limited order, and they may be executed in other orders. Moreover, at least a part of the steps in the flow chart of the drawings may include multiple sub-steps or multiple stages. These sub-steps or stages are not necessarily executed at the same time, but may be executed at different times. And these sub-steps or stages are not necessarily performed sequentially, but may be performed in turn or alternately with other steps, or sub-steps of other steps, or at least a part of stages.

The above described is only a part of embodiments of the present disclosure. It should be noted that various alternations and modifications may be made by those ordinary skilled in the art without deviating from the principal of the present disclosure, and such alternations and modifications should be considered as falling within the scope of the present disclosure

The invention claimed is:

1. A control method for controlling a wind turbine, the control method comprising:
   obtaining a current wind direction of an upstream wind turbine in a wind farm in real time;
   determining a current main wind direction to which the current wind direction of the upstream wind turbine belongs;
   determining a downstream wind turbine associated with the current main wind direction;
   determining a control instruction for the downstream wind turbine associated with the current main wind direction, based on an operation state and an operation parameter of the downstream wind turbine associated with the current main wind direction, comprising:
      determining whether the downstream wind turbine associated with the current main wind direction is in a shutdown state or a standby state;
      in response to determining that the downstream wind turbine associated with the current main wind direction is in the shutdown state or the standby state, determining a first yawing deviation of the downstream wind turbine associated with the current main wind direction based on the current wind direction of the upstream wind turbine belonging to the current main wind direction and a yawing position of the downstream wind turbine associated with the current main wind direction; and
      generating a first yawing control instruction for the downstream wind turbine associated with the current main wind direction, based on the first yawing deviation; and
   controlling the downstream wind turbine associated with the current main wind direction, based on the control instruction.

2. The control method according to claim 1, wherein determining the current main wind direction comprise:
   determining whether the current wind direction of the upstream wind turbine belongs to one of a plurality of main wind directions of the upstream wind turbine; and
   in response to determining that the current wind direction belongs to one of the plurality of main wind directions of the upstream wind turbine, determining the main wind direction to which the current wind direction belongs as the current main wind direction.

3. The control method according to claim 1, wherein:
   the first yawing deviation is obtained by subtracting the yawing position of the downstream wind turbine associated with the current main wind direction from the current wind direction of the upstream wind turbine belonging to the current main wind direction; and
   identification information of the downstream wind turbine associated with the current main wind direction is carried into the first yawing control instruction, and a yawing variable and a wind turbine state variable in the fir yawing control instruction are set as the first yawing deviation and entering the standby state, respectively.

4. The control method according to claim 1, further comprising:
   determining whether the downstream wind turbine associated with the current main wind direction is in a grid-connected power generation state;
   in response to determining that the downstream wind turbine associated with the current main wind direction is in the grid-connected power generation state, determining a second yawing deviation of the downstream wind turbine associated with the current main wind direction when an average wind direction change angle of the upstream wind turbine belonging to the current main wind direction in a first specified time period is greater than a first threshold; and
   generating a second yawing control instruction for the downstream wind turbine associated with the current main wind direction, based on the second yawing deviation.

5. The control method according to claim 4, wherein:
   the second yawing deviation of the downstream wind turbine associated with the current main wind direction is obtained by subtracting an average absolute wind direction of the upstream wind turbine belonging to the current main wind direction in a previous first specified time period from an average absolute wind direction of the upstream wind turbine in a current first specified time period; and
   identification information of the downstream wind turbine associated with the current main wind direction is carried into the second yawing control instruction, and a yawing variable in the second yawing control instruction is set as the second yawing deviation.

6. The control method according to claim 1, further comprising:
determining whether the downstream wind turbine associated with the current main wind direction is in a grid-connected power generation state;
in response to determining that the downstream wind turbine associated with the current main wind direction is in the grid-connected power generation state, determining whether an average wind speed change of t upstream wind turbine belonging to the current main wind direction in a second specified time period is greater than a second threshold;
in response to determining that the average wind speed change in the second specified time period is greater than the second threshold, determining whether a pitch angle of the downstream wind turbine associated with the current main wind direction is within a specified range;
in response to determining that the pitch angle is within the specified range, determining a minimum pitch angle of the downstream wind turbine associated with the current main wind direction; and
generating a pitch control instruction for the downstream wind turbine associated with the current main wind direction based on the minimum pitch angle.

7. The control method according to claim 6, wherein:
the average wind speed change is obtained by subtracting an average wind speed of the upstream wind turbine belonging to the current main wind direction in a previous second specified time period from an average wind speed of the upstream wind turbine in a current second specified time period; and
identification information of the downstream wind turbine associated with the current main wind direction is carried into the pitch control instruction, and a pitch angle variable in the pitch control instruction is set as the minimum pitch angle.

8. The control method according to claim 1, further comprising:
determining whether a current operation state of the upstream wind turbine is in a grid-connected state; and
in response to determining that the current operation state of the upstream wind turbine is in the grid-connected state, determining the control instruction.

9. The control method according to claim 1, further comprising:
obtaining a wind speed, an absolute wind direction and a time stamp of each upstream wind turbine in the wind farm during a first sampling time period; and determining an average wind speed, a maximum wind speed and a minimum wind speed in the absolute wind direction of each upstream wind turbine during a second sampling period, wherein the first sampling time period comprises a plurality of second sampling time periods;
dividing a plurality of sectors each with a specified angle for each upstream wind turbine, determining a wind frequency of each sector in the first sampling time period, and determining a predetermined number of sectors with a largest wind frequency as main wind directions of each upstream wind turbine;
for each main wind direction of each upstream wind turbine, determining a quantity of cumulative start-up times and each start-up time point of the upstream wind turbine during the first sampling time period; and
for each of other wind turbines except the upstream wind turbines in the wind farm, determining whether a ratio of a quantity of cumulative start-up times of the other wind turbine during the first sampling time period to the quantity of cumulative start-up times of an upstream wind turbine reaches a ratio threshold, and whether the other wind turbine is started up within a set time period from a start-up time point of the upstream wind turbine, and determining that the other wind turbine is a downstream wind turbine of the upstream wind turbine in the main wind direction in response to both positive determination results.

10. The control method according to claim 9, wherein:
for each sector of each upstream wind turbine, a frequency that the average wind speed during the second sampling time period in the absolute wind direction appears in the sector during the first sampling time period is determined, and the frequency is determined as the wind frequency.

11. A control apparatus for a wind turbine, comprising:
a current wind direction determination module, configured to obtain a current wind direction of an upstream wind turbine in a wind farm in real time;
a main wind direction determination module, configured to determine a current main wind direction to which the current wind direction of the upstream wind turbine belongs;
a downstream wind turbine determination module, configured to determine a downstream wind turbine associated with the current main wind direction; and
a control instruction determination module, configured to:
determine whether the downstream wind turbine associated with the current main wind direction is in a shutdown state or a standby state;
in response to determining that the downstream wind turbine associated with the current main wind direction is in the shutdown state or the standby state, determine a first yawing deviation of the downstream wind turbine associated with the current main wind direction based on the current wind direction of the upstream wind turbine belonging to the current main wind direction and a yawing position of the downstream wind turbine associated with the current main wind direction; and
generate a control instruction for the downstream wind turbine associated with the current main wind direction, based on the first yawing deviation.

12. The control apparatus according to claim 11, wherein the control apparatus is integrated in a central controller of the wind farm.

13. A controller for a wind turbine communicatively connected with the control apparatus according to claim 11, wherein the controller comprises:
a receiving module, configured to receive the control instruction for the downstream wind turbine associated with the current main wind direction sent by the control apparatus; and
a control module, configured to control the downstream wind turbine associated with the current main wind direction based on the control instruction received by the receiving module.

14. The controller according to claim 13, wherein the controller integrated in a main controller of the wind turbine.

15. A control system for a wind turbine, comprising:
the control apparatus according to claim 11.

16. A non-transitory computer-readable storage medium stored with a computer program, wherein the computer program, when executed by a processor, implements the control method according to claim 1.

* * * * *